United States Patent [19]
Kurz et al.

[11] Patent Number: 6,046,141
[45] Date of Patent: Apr. 4, 2000

[54] THERMOPLASTIC MOLDING COMPOSITION

[75] Inventors: Klaus Kurz, Kelsterbach; Oskar Schleith, Hofheim, both of Germany

[73] Assignee: Ticona GmbH, Germany

[21] Appl. No.: 09/162,093

[22] Filed: Sep. 28, 1998

[30] Foreign Application Priority Data

Sep. 29, 1997 [DE] Germany .......................... 197 42 884

[51] Int. Cl.[7] ........................ C10M 107/00; C08L 67/00; C08L 77/00
[52] U.S. Cl. .......................... 508/100; 524/487; 524/275; 524/605
[58] Field of Search .............................. 508/100; 524/487

[56] References Cited

U.S. PATENT DOCUMENTS

| | | | |
|---|---|---|---|
| 4,634,732 | 1/1987 | Miller et al. | 524/504 |
| 4,646,618 | 3/1987 | Kurth et al. | 89/1.816 |
| 4,713,408 | 9/1987 | Takahashi et al. | 524/161 |
| 4,790,970 | 12/1988 | Kurth et al. | 264/130 |
| 5,102,943 | 4/1992 | Logullo | 524/487 |
| 5,155,155 | 10/1992 | Jurlaro | 524/275 |
| 5,254,613 | 10/1993 | Bayer et al. | 524/277 |
| 5,416,152 | 5/1995 | Fleischer et al. | 524/487 |
| 5,756,567 | 5/1998 | Rohrmann | 524/232 |
| 5,889,102 | 3/1999 | Haack et al. | 524/494 |

FOREIGN PATENT DOCUMENTS

| | | |
|---|---|---|
| 0 277 381 | 8/1988 | European Pat. Off. . |
| 0 552 520 A1 | 7/1993 | European Pat. Off. . |
| 0 663 424 A2 | 7/1994 | European Pat. Off. . |
| WO 93/11206 | 6/1993 | WIPO . |

OTHER PUBLICATIONS

Patent Abstracts of Japan, 58059255, Apr. 8, 1983 Mitsubishi Chem Ind Ltd.
Patent Abstracts of Japan, 08134315, May 28, 1996 Japan Synthetic Rubber Co. Ltd.

*Primary Examiner*—Ellen M. McAvoy
*Attorney, Agent, or Firm*—Connolly Bove Lodge & Hutz

[57] ABSTRACT

Thermoplastic molding compositions which comprise an oxidized polyethylene have high abrasion resistance and permit a less severe reduction of elongation at break at the frequently unavoidable weld lines. The molding compositions have low static friction. They are therefore used in articles which have a tight fit but are nevertheless readily separable, and also for low-friction and wear-resistant articles which require to slide.

7 Claims, No Drawings

THERMOPLASTIC MOLDING COMPOSITION

The invention relates to a thermoplastic molding composition with abrasion performance improved by adding oxidized polyethylene wax, and to the use thereof.

Friction and wear are unavoidable phenomena accompanying mechanical sliding processes. They can be minimized by selecting suitable material pairings. Thermoplastic molding compositions, which are used as versatile materials in engineering, do not always have the desired tribological properties, such as low coefficient of friction and low wear. Additives are therefore used to improve their sliding friction performance. Some engineering thermoplastics have fundamentally good sliding friction performance. These include polyesters, polyamides and polyoxymethylenes. The latter are materials with particular sliding capability due to high crystallinity and linear polymer chains. Even with these plastics, appropriate additives are used for further optimization of sliding friction performance.

It is well known that additions of lubricants can improve the tribological, i.e. sliding and frictional, properties of thermoplastics. For example, it is known that polar oxidized and non-polar polyethylene waxes can be used as lubricants for polar plastics, such as polyvinyl chloride (PVC). However, use with PVC does not allow conclusions to be drawn on the possibility of use with engineering thermoplastics, such as POM, polyester and polyamide. The examples listed for lubricants in these plastics are generally non-oxidized polyethylene waxes, silicone oils, fatty acid esters, fatty acid diamides, wax acids, wax acid esters and metal soaps, and also combinations of various lubricants. Lubricants are described in Gächter/Müller, "Taschenbuch der Kunststoff-Additive" [Plastics Additives Handbook], 3rd Edition, Carl Hanser Verlag Munich/Vienna 1994, pp. 478–504, which is incorporated herein by way of reference.

Even though addition of lubricants can generally improve abrasion resistance, there is often a severe reduction in the elongation at break at the mostly unavoidable weld lines.

The object of the present invention was to avoid the known disadvantages, and to improve the frictional and wear performance of thermoplastics without significantly impairing their mechanical properties, in particular their weld line strength.

The invention provides a molding composition composed of from 95 to 99.9 parts by weight, preferably from 98 to 99.5 parts by weight, of an engineering thermoplastic (A) selected from the class consisting of polyoxymethylenes, polyesters and polyamides, and from 0.1 to 5 parts by weight, preferably from 0.2 to 2 parts by weight, of an oxidized polyethylene wax (B). The molding compositions may comprise additives and processing aids (C), such as stabilizers, mold-release aids and pigments, and also fillers and reinforcing materials, such as glass fibers, glass beads, chalk, talc, zinc oxide and wollastonite, or polymeric lubricants, such as ultra-high-molecular-weight polyethylene (UHMWPE), polytetrafluoroethylene (PTFE) and a graft copolymer which is a product of a graft reaction of an olefin polymer and an acrylonitrile-styrene copolymer, or mixtures of these, in amounts of from 0 to 50 parts by weight, preferably from 5 to 30 parts by weight.

The total of parts by weight of components (A) to (C) here is always 100.

The object of the invention was achieved by the use of a high-molecular-weight polyethylene wax. The particular feature of this product is its functional groups which have oxygen bonded at the surface. They are produced in a controlled manner by oxidative post-treatment.

The oxidative post-treatment of the polyethylene wax improves its affinity, e.g. toward the POM. Compared with other polyethylene waxes, there is a less severe reduction in extension in the weld line and the abrasion occurring during sliding is reduced.

Thermoplastics modified merely with lubricants are inadequate for applications with specific property profiles, such as high stiffness or low warpage. Higher stiffness and strength are obtained by adding reinforcing materials, and higher dimensional stability is obtained by means of fillers.

The small lubricant additions which are adequate for unreinforced thermoplastics are insufficient here. Polymeric lubricants are preferably also added to these mixtures, generally in proportions of more than 5 parts by weight, to achieve the required tribological properties.

Suitable components (A) are the engineering plastics POM, polyester and polyamide mentioned at the outset. Among the polyesters, particular preference is given to polyethylene terephthalate (PET) and polybutylene terephthalate (PBT), and among the polyamides nylon-6 and nylon-6,6 are particularly preferred.

The polyoxymethylenes (POMs), as described, for example, in DE-A 29 47 490, are generally unbranched linear polymers which generally comprise at least 80%, preferably at least 90%, of oxymethylene units (—$CH_2O$—). The term polyoxymethylenes here encompasses both homopolymers of formaldehyde and its cyclic oligomers, such as trioxane and tetroxane, and also corresponding copolymers.

Homopolymers of formaldehyde or of trioxane are polymers whose hydroxyl end groups have been chemically stabilized with respect to degradation, e.g. by esterification or etherification. Copolymers are polymers of formaldehyde or of its cyclic oligomers, in particular trioxane, with cyclic ethers and/or with cyclic acetals and/or with linear polyacetals.

Such POM homo- or copolymers are known to the person skilled in the art and are described in the literature. Very generally, these polymers have at least 50 mol % of recurring units —$CH_2O$— in their main polymer chain. The homopolymers are generally prepared by polymerizing formaldehyde or trioxane, preferably in the presence of suitable catalysts.

For the purposes of the invention, preferred components (A) are POM copolymers, especially those which besides the recurring units —$CH_2O$— also have up to 50 mol %, preferably from 0.1 to 20 mol % and in particular from 0.5 to 10 mol %, of recurring units

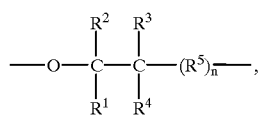

where $R^1$ to $R^4$, independently of one another, are a hydrogen atom, a $C_1$–$C_4$-alkyl group or a halo-substituted alkyl group having from 1 to 4 carbon atoms, and $R^5$ is —$CH_2$—, —$CH_2O$—, a $C_1$–$C_4$-alkyl- or $C_1$–$C_4$-haloalkyl-substituted methylene group or a corresponding oxymethylene group, and n is from 0 to 3. These groups may advantageously be introduced into the copolymers by ring-opening of cyclic ethers. Preferred cyclic ethers have the formula

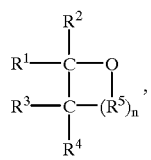

where $R^1$ to $R^5$ and n are as defined above. Merely as examples, mention may be made of ethylene oxide, propylene 1,2-oxide, butylene 1,2-oxide, butylene 1,3-oxide, 1,3-dioxane, 1,3-dioxolane and 1,3-dioxepan as cyclic ethers, and also of linear oligo- or polyformals, such as polydioxolane and polydioxepan as comonomers.

Particularly advantageous copolymers are made from 99.5–95 mol % of trioxane and from 0.5–5 mol % of one of the abovementioned comonomers.

Other suitable components (A) are oxymethylene terpolymers, which are prepared, for example, by reacting trioxane with one of the cyclic ethers described above and with a third monomer, preferably a bifunctional compound of the formula

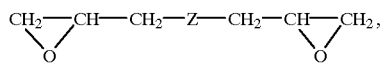

where Z is a chemical bond, —O— or —ORO— (R=$C_1$–$C_8$-alkylene or $C_2$–$C_8$-cycloalkylene).

Preferred monomers of this type are ethylene diglycide, diglycidyl ether and diethers of glycidyls and formaldehyde, dioxane or trioxane in a molar ratio of 2:1, and also diethers of 2 mol of glycidyl compound and 1 mol of an aliphatic diol with from 2 to 8 carbon atoms, such as the diglycidyl ethers of ethylene glycol, 1,4-butanediol, 1,3-butanediol, 1,3-cyclobutanediol, 1,2-propanediol and 1,4-cyclohexanediol, to mention only a few examples.

Processes for preparing the POM homo- and copolymers described above are known to the person skilled in the art and are described in the literature.

The preferred POM copolymers have melting points of at least 150° C. and molecular weights (weight-average) $M_w$ in the range from 5000 to 200,000, preferably from 7000 to 150,000. Particular preference is given to end-group-stabilized POM polymers which have C-C bonds at their chain ends.

The POM polymers used generally have a melt index (MFR 190/2.16) of from 2 to 50 cm$^3$/10 min (ISO 1133).

The oxidized polyethylene wax (B) is a high-molecular-weight polar wax and generally has an acid number of from 12 to 20 mg KOH/g and a viscosity of from 3000 to 5000 mPa·s.

The novel molding compositions are particularly suitable for functional components which have a tight fit, i.e. for components which, for example, when inserted into one another adhere to each other firmly but can nevertheless be readily separated from one another again. The low static friction coefficient of the novel molding composition is a particular advantage for functional components of this type. The molding compositions are moreover suitable for low-friction and abrasion-resistant molded articles which require to slide, such as gearwheels, sliding bearings, zip or sliding fasteners, slide rails, casters, cams and cam wheels.

EXAMPLES

For Examples 1, 2 and 3 according to the invention, and also for Comparative Examples I, II, III, IV and V, use was made of a copolymer made from trioxane and dioxolane with a volume melt index MFR 190/2.16 of 8 cm$^3$/10 min. The copolymer was mixed with various concentrations (Table 1) of the following lubricants.

TABLE 1

| Lubricant | Powder [μm] | Drop point [° C.] | Acid number [mg KOH/g] | Hydrolysis number [mg KOH/g] | Viscosity at 140° C. [mPa · s] | Density [g/cm$^3$] |
|---|---|---|---|---|---|---|
| Polyethylene wax PE 130* (comparison) | <500 | 124 | 0 | 0 | 300 | 0.98 |
| Polyethylene wax PED 191* (according to the invention) | <500 | 123 | 16 | 28 | 4000 | 0.98 |
| Stearyl stearate (comparison) | — | about 55 | — | — | — | 0.83 |

*Manufacturer: Clariant GmbH, Gersthofen, Germany

In each case, the POM copolymer was mixed with, respectively, 0.3, 1.0 and 2.0 parts by weight of polyethylene wax or 2.0 parts by weight of stearyl stearate in a high-speed Diosna V 100 fluid mixer (Dierks u. Söhne, Osnabrück, Germany), melted in a ZE 25×33 D twin-screw extruder (Berstorff, Hanover, Germany) at a melt temperature of 200° C., and then granulated.

The granules were dried for eight hours at 120° C. and then injection molded to give test specimens for mechanical and tribological tests. The injection molding machine used was of type KM 90/210 B (Krauss Maffei, Munich, Germany). The process conditions were selected in accordance with the recommendations of ISO 9988-2, material standard for POM.

Measurements:

Tensile test in accordance with ISO 527, Parts 1 and 2.

Wear measurements:

Abrasion is measured on an abrasion shaft—a rotating shaft compressed onto which were cylindrical test specimens of 12 mm diameter made from the material to be tested. The volume of wear is determined as a function of time. The principle of the test corresponds to the pin on ring principle according to ISO/DIS 7148-2.

| Test conditions | |
|---|---|
| Material of shaft | Steel |
| Shaft diameter | 65 mm |
| Roughness depth Rz | about 2 μm |
| Load | 3.1 N |
| Sliding velocity | 136 m/min |
| Duration of test | 60 h |

Table 2 gives the results of the wear measurements and the tensile test.

TABLE 2

|  | 1 | 2 | 3 | I | II | III | IV | V |
|---|---|---|---|---|---|---|---|---|
| POM copolymer [parts by weight] | 99.7 | 99.0 | 98.0 | 100 | 98 | 99.7 | 99.0 | 98.0 |
| Polyethylene wax PE 130 [parts by weight] | — | — | — | — | — | 0.3 | 1.0 | 2.0 |
| Polyethylene wax PED 191 [parts by weight] | 0.3 | 1.0 | 2.0 | — | — | — | — | — |
| Stearyl stearate [parts by weight] | — | — | — | — | 2.0 | — | — | — |
| Measurements | | | | | | | | |
| Abraded volume [mm$^3$] | 4.5 | 4.2 | 5.0 | 9.0 | 24.9 | 8.1 | 9.3 | 29.1 |
| Yield stress [MPa] | 67.3 | 64.8 | 61.6 | 67.2 | 60.6 | 66.6 | 64.2 | 61.5 |
| Elongation at break without weld line [%] | 17.9 | 22.3 | 23.7 | 15.3 | 20.6 | 16.2 | 22.5 | 24.0 |
| Elongation at break with weld line [%] | 15.1 | 11.1 | 6.9 | 14.1 | 7.0 | 10.7 | 9.4 | 7.1 |

The tests clearly show that it is only when the oxidized polyethylene wax (PED 191) is used that a particularly low abraded volume is achieved. At the same time, the values for elongation at break with and without weld line are entirely comparable with those for the other formulations. However, the value depends on the proportion of wax in the formulation.

We claim:

1. A thermoplastic molding composition composed of (A) from 95 to 99.8 parts by weight of at least one engineering thermoplastic selected from the class consisting of polyoxymethylenes, polyesters and polyamides, (B) from 0.2 to 5 parts by weight of an oxidized polyethylene wax and (C) from 0 to 50 parts by weight of fillers, reinforcing materials and/or polymeric lubricants, where the total of the parts by weight of components (A), (B) and (C) is always 100.

2. The molding composition as claimed in claim 1, which is composed of (A) from 98 to 99.5 parts by weight of component (A), (B) from 0.2 to 2.0 parts by weight of component (B) and (C) from 5 to 30 parts by weight of component (C).

3. The molding composition as claimed in claim 1, wherein the thermoplastic (A) used is a nylon-6, nylon-6,6, polyethylene terephthalate, polybutylene terephthalat or a polyoxymethylene which has a melt index (MFR 190/2.16) of from 2 to 50 cm$^3$/10 min.

4. The molding composition as claimed in claim 1, wherein component (C) is selected from the class consisting of the fillers chalk, talc, wollastonite, mica, zinc oxide and silica, the reinforcing materials glass fibers, carbon fibers and organic high-modulus fibers and the polymeric lubricants polytetrafluoroethylene in powder or fiber form, UHMW polyethylene and graft polymers obtained from the graft reaction of polyethylene and acrylonitrile-styrene copolymer, where component (C) may be one or more of these constituents.

5. The molding composition as claimed in claim 1, wherein component (B) is a high-molecular-weight polar polyethylene wax and has an acid number of from 12 to 20 mg KOH/g and a viscosity of from 3000 to 5000 mPa·s.

6. Moldings comprising the molding composition as claimed in claim 1 in the form of functional components which have a tight fit or molded articles required to slide.

7. Moldings comprising the molding composition of claim 1 in the form of gearwheels, sliding bearings, zip or sliding fasteners, slide rails, casters, cams or cam wheels.

* * * * *